US007983556B2

(12) United States Patent
Westerweck et al.

(10) Patent No.: US 7,983,556 B2
(45) Date of Patent: Jul. 19, 2011

(54) CAMERA MODULE WITH CONTAMINATION REDUCTION FEATURE

(75) Inventors: Lothar R. Westerweck, San Jose, CA (US); Albert John Y. Chua, San Jose, CA (US); Bahram Afshari, Los Altos, CA (US); Dennis R. Berube, Cranston, RI (US); John W. Toor, Palo Alto, CA (US); Elaine B. Bogue, Dunstable, MA (US)

(73) Assignee: Flextronics AP LLC, Broomfield, CO (US)

( * ) Notice: Subject to any disclaimer, the term of this patent is extended or adjusted under 35 U.S.C. 154(b) by 378 days.

(21) Appl. No.: 11/982,726

(22) Filed: Nov. 2, 2007

(65) Prior Publication Data
US 2008/0152339 A1    Jun. 26, 2008

Related U.S. Application Data

(60) Provisional application No. 60/864,348, filed on Nov. 3, 2006.

(51) Int. Cl.
*G03B 17/00*    (2006.01)
*G03B 17/02*    (2006.01)

(52) U.S. Cl. .......................................... 396/535; 396/73

(58) Field of Classification Search .................... 396/73, 396/79, 439, 535
See application file for complete search history.

(56) References Cited

U.S. PATENT DOCUMENTS

| 3,393,622 | A | 7/1968 | Schöttle et al. |
| 3,696,725 | A | 10/1972 | Lange |
| 4,229,092 | A | 10/1980 | Iwata |
| 4,457,619 | A | 7/1984 | Takahashi et al. |
| 5,054,886 | A | 10/1991 | Ozaki et al. |
| 5,218,484 | A | 6/1993 | Terai |
| 5,825,559 | A | 10/1998 | Johnson et al. |
| 5,831,777 | A * | 11/1998 | Iwasa ............................. 359/826 |
| 6,011,661 | A | 1/2000 | Weng ............................. 359/819 |
| 6,351,288 | B1 | 2/2002 | Johnson et al. |
| 6,359,740 | B1 | 3/2002 | Tsuchiya ....................... 359/819 |
| 6,426,839 | B2 | 7/2002 | Dou et al. ....................... 359/823 |
| 6,476,985 | B2 | 11/2002 | Dou et al. |

(Continued)

FOREIGN PATENT DOCUMENTS

DE            20017490        12/2000

(Continued)

OTHER PUBLICATIONS

PCT Application No. PCT/US 2007/023388, International Search Report and Written Opinion dated Apr. 3, 2008.

(Continued)

*Primary Examiner* — Rodney E Fuller
(74) *Attorney, Agent, or Firm* — Henneman & Associates, PLC; Larry E. Henneman, Jr.

(57) ABSTRACT

A novel digital camera module includes an image capture device, a lens unit including a body, a housing including an opening for receiving the lens unit and positioning the lens unit with respect to the image capture device, and a contaminant trap formed by an isolated annular space between the lens unit and the opening of the housing. In a particular embodiment, the opening of the housing includes surfaces having at least two different perimeters, the smaller of which slidably engages the outer surface of the lens unit. The contaminant trap collects and contains any contaminants before they reach vulnerable components such as the image capture device and/or other optical components within the camera module.

100 Claims, 8 Drawing Sheets

U.S. PATENT DOCUMENTS

| | | | |
|---|---|---|---|
| 6,555,812 B1 | 4/2003 | Bohn | 250/239 |
| 6,590,720 B2 | 7/2003 | Oba | 359/819 |
| 6,654,187 B2 | 11/2003 | Ning | |
| 6,771,439 B2 | 8/2004 | Ting | |
| 7,127,162 B2 | 10/2006 | Mano | |
| 7,190,404 B2 | 3/2007 | Shinomiya | |
| 7,422,382 B2 | 9/2008 | Seo | |
| 7,469,100 B2 | 12/2008 | Toor et al. | |
| 7,684,689 B2 | 3/2010 | Shangguan et al. | |
| 2003/0137595 A1 | 7/2003 | Takachi | |
| 2003/0137747 A1 | 7/2003 | Ting | |
| 2005/0063695 A1 | 3/2005 | Kameyama | |
| 2005/0185088 A1 | 8/2005 | Kale et al. | 348/374 |
| 2005/0190283 A1* | 9/2005 | Ish-Shalom et al. | 348/340 |
| 2005/0248684 A1 | 11/2005 | Machida | 348/373 |
| 2005/0285973 A1 | 12/2005 | Singh et al. | 348/374 |
| 2006/0103953 A1 | 5/2006 | Lee et al. | 359/819 |
| 2006/0170811 A1 | 8/2006 | Joung | 348/342 |
| 2006/0193064 A1 | 8/2006 | Kim | 359/811 |
| 2006/0216014 A1 | 9/2006 | Morinaga et al. | |
| 2007/0008631 A1 | 1/2007 | Webster et al. | 359/819 |
| 2007/0009246 A1 | 1/2007 | Lee | |
| 2007/0058964 A1 | 3/2007 | Shangguan et al. | |
| 2007/0077051 A1 | 4/2007 | Toor et al. | 396/144 |
| 2008/0159734 A1 | 7/2008 | Westerweck et al. | 396/541 |
| 2009/0110385 A1 | 4/2009 | Toor et al. | |

FOREIGN PATENT DOCUMENTS

| | | |
|---|---|---|
| EP | 1 288 694 A1 | 3/2003 |
| JP | 2001-292365 | 10/2001 |
| TW | 1221207 | 9/2004 |
| TW | 236 573 B | 7/2005 |
| WO | WO 2007/035418 | 3/2007 |
| WO | WO 2007/040933 A2 | 4/2007 |
| WO | WO 2008/057517 | 5/2008 |
| WO | WO 2008/057544 | 5/2008 |

OTHER PUBLICATIONS

PCT Application No. PCT/US 2007/023388, International Preliminary Report on Patentability dated May 14, 2009.
PCT Application No. PCT/US 2007/023335, International Search Report and Written Opinion dated Mar. 12, 2008.
PCT Application No. PCT/US 2007/023335, International Preliminary Report on Patentability dated May 14, 2009.
U.S. Appl. No. 11/242,646, Office Action dated Jan. 30, 2008.
Int'l App. No. PCT/US2006/035660, International Search Report and Written Opinion dated May 22, 2007.
Int'l App. No. PCT/US2006/035660, International Preliminary Report on Patentability dated Apr. 17, 2008.
EP App. No. 06803508.8, Extended European Search Report dated Jun. 25, 2010.
TW App. No. 095134310, Office Action dated Nov. 4, 2008.
TW App. No. 095134310, Office Action dated Jun. 23, 2008.
U.S. Appl. No. 12/317,295, Office Action dated Jul. 17, 2009.
U.S. Appl. No. 12/317,295, Office Action dated Feb. 22, 2010.
CN Application No. 200780040705.4, Office Action dated Jun. 11, 2010 (with English translation).
U.S. Appl. No. 11/228,010, Office Action dated Aug. 2, 2007.
U.S. Appl. No. 11/228,010, Office Action dated Apr. 23, 2008.
U.S. Appl. No. 11/228,010, Interview Summary dated Oct. 14, 2008.
U.S. Appl. No. 11/228,010, Office Action dated Jan. 7, 2009.
PCT Application No. PCT/US2006/035852, International Search Report and Written Opinion dated Sep. 13, 2007.
PCT Application No. PCT/US2006/035852, International Preliminary Report on Patentability dated Mar. 27, 2008.
CN Application No. 200680040738.4, Office Action dated Oct. 30, 2009.
TW Application No. 95130828, Office Action dated Nov. 26, 2009.
CN Application No. 200780040705.4, Notice of Allowance dated Jan. 7, 2011 (English translation).
U.S. Appl. No. 11/982,846, Notice of Allowance dated Apr. 7, 2010.
U.S. Appl. No. 11/242,646, Notice of Allowance dated Aug. 21, 3008.
U.S. Appl. No. 11/242,646, Supplemental Notice of Allowance dated Sep. 24, 3008.
EP Application No. 06 803 508.8, filed Apr. 28, 2008, Office Action dated Jul. 13, 2010.
TW Application No. 095134310, Notice of Allowance dated Dec. 16, 2009 (English translation).
U.S. Appl. No. 12/317,295, Notice of Allowance dated Sep. 9, 2010.
U.S. Appl. No. 12/317,295, Notice of Petition Granted dated Oct. 25, 2010.
U.S. Appl. No. 11/228,010, Notice of Allowance dated Nov. 3, 2009.
CN Application No. 200680040738.4, Office Action dated Aug. 4, 2010 (English translation).
EP Application No. 06 803 604.5, Restriction Requirement dated May 26, 2010.
EP Application No. 06 803 604.5, European Search Report dated Sep. 6, 2010.
EP Application No. 06 803 604.5, Office Action dated Sep. 23, 2010.
TW Application No. 95130828, Office Action dated Oct. 28, 2010 (English translation).

* cited by examiner

CAMERA MODULE WITH CONTAMINATION REDUCTION FEATURE

RELATED APPLICATIONS

This application claims the benefit of prior U.S. Provisional Patent Application Ser. No. 60/864,348, filed on Nov. 3, 2006 by at least one common inventor, which is incorporated herein by reference in its entirety.

BACKGROUND OF THE INVENTION

1. Field of the Invention

The present invention relates generally to electronic devices, and more particularly to digital camera modules. Even more particularly, the present invention relates to a system for focusing a digital camera module that prevents debris and particulate matter produced by the focusing process from contaminating the sensor array of an image capture device.

2. Description of the Background Art

Digital camera modules are currently being incorporated into a variety of electronic devices. Such camera hosting devices include, but are not limited to, cellular telephones, personal data assistants (PDAs), and computers. The demand for digital camera modules continues to grow as the ability to incorporate the camera modules into host devices expands. Therefore, one design goal of digital camera modules is to make them as small as possible so that they will fit into an electronic device without substantially increasing the overall size of the device. Means for achieving this goal must, of course, preserve the quality of the image captured by the camera modules.

Such digital camera modules typically include a substrate, an image capture device, a housing, and a lens unit. The substrate is typically a printed circuit board (PCB) that includes circuitry to facilitate data exchange between the image capture device and the host device. The image capture device is mounted and electrically coupled to the circuitry of the PCB. The housing is then mounted on the PCB over the image capture device. The housing includes an opening that receives and centers the lens unit with respect the image capture device. Typically, the opening includes a set of threads and the lens unit includes a complementary set of threads that facilitate the factory focusing of the camera module. During a factory focus operation, for example, focusing equipment rotates the lens unit with respect to the housing, which adjusts the distance between the lens unit and the image capture device. When the lens unit is properly focused, it is fixed in position with respect to the housing with an adhesive, a thermal weld, or the like.

Although camera modules that are focused via thread sets provide for relatively accurate focal adjustments, they still have disadvantages. For example, as the lens unit is rotated within the housing, sliding friction between threads creates particulate debris that could easily contaminate the image sensor and/or other optical components (e.g., infra-red filters, protective covers, other lenses, etc.). Consequently, these contaminants accumulate and noticeably degrade the quality of images captured by, for example, blocking light to the image sensor.

It should be noted that although threaded components are used here as an example, other types of focusing components can similarly produce particulate debris that reduces the quality of the captured images. For example, U.S. Pat. No. 6,426,839 issued to Dou et al. discloses a camera module including a plurality of ramps formed directly on a stationary lens located inside the camera module. A rotatable lens carrier (having a separate lens) includes a plurality of legs that engage the ramped surfaces of the stationary lens. Rotating the lens carrier causes the legs of the lens carrier to move up or down the ramped surfaces of the lens, thereby moving the second lens closer to or further from the stationary lens, depending on the direction of rotation. Because the legs of the lens carrier slide over the ramped surfaces of the stationary lens, particulate debris can still be produced and collect on the imaging components of the camera module.

In addition to particulate debris produced by friction, ramped housings are also susceptible to other contaminants. For example, adhesives used to fix lens units to housings can easily run down into the camera module and contaminate the imaging components. Ramped modules are particularly susceptible to fluid contamination because the interface between the lens unit and the housing is typically not as tight as that of threaded camera modules. Generally, the walls of the lens unit and the housing are smooth, as opposed to having threads formed thereon. In addition to providing a path for contaminant entry, the loose fit between the lens unit and the housing can allow the lens barrel to fall out of the housing during steps of the manufacturing process that occur prior to fixing the lens unit to the housing, thereby reducing yield.

In efforts to minimize the accumulation of such contaminants, manufacturers have employed contaminant collecting surfaces within camera modules. For example, U.S. 2006/0103953 (Lee et al.) discloses a camera module that includes a particle collecting groove defined within the housing. In particular, the groove is formed around the peripheral surface of the light receiving aperture of the housing. The groove collects some the debris before it can reach the image sensor or other optical components within the camera module.

Although the groove formed on the camera module disclosed in U.S. 2006/0103953 reduces the amount of debris that collects on the image sensor, there are still some disadvantages. For example, debris is still free to move out of the groove because the groove is not entirely isolated. Further, it is unlikely that the camera module will remain upright during use, thus debris is free to fall back out of the groove and obstruct the image sensor and/or optics.

What is needed, therefore, is a camera module design that minimizes the contamination of optical components during assembly and focusing processes. What is also needed is a camera module design that isolates contaminants before they collect on components within the camera module.

SUMMARY

The present invention overcomes the problems associated with the prior art by providing a camera module that includes a contaminant trap for collecting contaminants that may enter the camera module. In addition, features are provided for temporarily locking a lens unit of the camera module in position with respect to a housing of the camera module, and also for limiting tilt of the lens unit with respect to the housing.

According to one embodiment, a camera module includes an image capture device, a lens unit and a housing. The lens unit includes a body that extends perpendicularly with respect an image capture surface of the image capture device. The body of the lens unit includes a first surface having a first outer perimeter (e.g., a circumference) parallel to the image capture surface of the image capture device.

The housing includes a mounting portion and a receiver portion. The mounting portion is coupled to the image capture device. The receiver portion defines an opening for receiving the lens unit. The receiving portion of the housing includes a first surface having a first inner perimeter and a second surface having a second inner perimeter. The first inner perimeter is smaller than the second inner perimeter, and the first surface of the opening is disposed between the second surface of the opening and the image capture device.

When the lens unit is positioned in the receiver portion of the housing, the first surface of the lens unit slidably contacts the first surface of the opening, thereby preventing contaminants from passing between the first surface of the lens unit and the first surface of the opening. The first surface of the lens unit remains in contact with the first surface of the receiver portion, even when the lens unit is moved along an axis perpendicular to the image capture surface (e.g., during a focusing operation), thereby maintaining the integrity of the particle trap.

The first surface of the opening and the second surface of the opening are joined by a first contaminant collecting surface. In a particular embodiment, the contaminant collecting surface includes a flat (optionally tilted) surface parallel to the image capture surface (e.g., a horizontal ledge). Alternatively, the contaminant collecting surface defines a channel. As shown, a plurality of various types to contaminant collecting surfaces can be used together in a single embodiment.

In the embodiment shown, the lens unit further includes a second surface having a second outer perimeter. The second outer perimeter is larger than the first outer perimeter, and the second surface of the lens unit slidably contacts the second surface of the opening.

The outer surfaces of the lens unit and the inner surfaces of the housing together form a particle trap in the form of an enclosed annular space, which is apart from the image capture surface. In particular, the first and second surfaces of the opening are joined by a first transitional surface, and the first and second surfaces of the lens unit are joined by a second transitional surface. Together, the first transitional surface, the second surface of the opening, the second transitional surface, and the first surface of the lens unit enclose the annular space. The space remains enclosed, even when the lens unit is moved, the volume of the annular space increasing as the distance between the lens unit and the image capture device is increased.

The disclosed embodiment includes additional particle traps. The opening in the housing includes a third surface having a third inner perimeter larger than the second inner perimeter of the second surface. The second surface is disposed between the third surface and the image capture device, and the third surface of the opening is joined to the second surface of the opening by a third transitional surface. Similarly, the lens unit also includes a third surface having a third outer perimeter, which is larger than the second outer perimeter of the second surface. The third surface of the lens unit slidably contacts the third surface of the receiver portion and is joined to the second surface of the lens unit by a fourth transitional surface to form a second particle trap.

The second particle trap has an annular shape and is bounded by the third surface of the opening, the third transitional surface, the second surface of the lens unit, and the fourth transitional surface. The annular space remains bounded, even when the lens unit is moved, the volume of the annular space increasing as the distance between the lens unit and the image capture device is increased.

The disclosed embodiment includes yet a third particle trap. The opening in the housing includes a fourth surface, which has a fourth inner perimeter that is larger than the third inner perimeter. The third surface of the opening is disposed between the fourth and second surfaces of the opening, and the third surface is joined to the fourth surface by a fifth transitional surface. The fourth surface of the opening, the fifth transitional surface, and the third surface of the lens unit form at least a portion of the third particle trap. The third particle trap also serves to trap excess adhesive used to bond the lens unit to the housing.

A focus mechanism is also disclosed. In the example shown, a plurality of ramps are formed on one of the lens unit and the housing, and a plurality of ramp engaging structures (e.g., complementary ramps) are formed on the other of the lens unit and the housing. At least one of the ramps forms a recess (e.g., a channel) for receiving an adhesive. Alternatively, the focus mechanism can include a thread set on the lens unit and a complementary thread set on the housing.

The camera module also includes an optional locking feature operative to temporarily secure the lens unit to the housing during the manufacturing process. The locking mechanism includes a first portion formed on the lens unit and a second portion formed on the housing. In the embodiment shown, the first portion of the locking mechanism includes a plurality of protrusions (e.g., ribs) formed on an outer surface of the lens unit. The second portion of the locking feature includes raised areas on an inner surface of the receiver portion of the housing. When the protrusions engage the raised areas, the lens unit is locked in place in the housing.

The protrusions also provide a stabilizing function. In particular, the protrusions extend a sufficient distance in a direction perpendicular to the image capture surface to limit the tilt of the lens unit within the opening of the housing.

A method for manufacturing a camera module includes providing an image capture device, providing a housing, providing a lens unit, and providing a locking feature for temporarily fixing the lens unit with respect to the housing. The method further includes mounting the housing to the image capture device, mounting the lens unit to the housing, rotating the lens unit to engage a first portion of the locking feature with a second portion of the locking feature, and then performing an additional manufacturing process on the camera module. The method further includes rotating the lens unit to disengage the first portion of the locking feature from the second portion of the locking feature, focusing the lens unit, and, finally, permanently fixing the lens unit with respect to the housing.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art by providing a digital camera module including a contaminant trap for isolating contaminants before they can collect on imaging components and degrade the quality of images captured. In the following description, numerous specific details are set forth (e.g., particular examples of focus devices, substrate types, attachment devices, etc.) in order to provide a thorough understanding of the invention. Those skilled in the art will recognize, however, that the invention may be practiced apart from these specific details. In other instances, details of well known camera module manufacturing practices (e.g., automated focus processes, materials selection, molding processes, etc.) and components (e.g., electronic circuitry, device interfaces, etc.) have been omitted, so as not to unnecessarily obscure the present invention.

Figure 1:
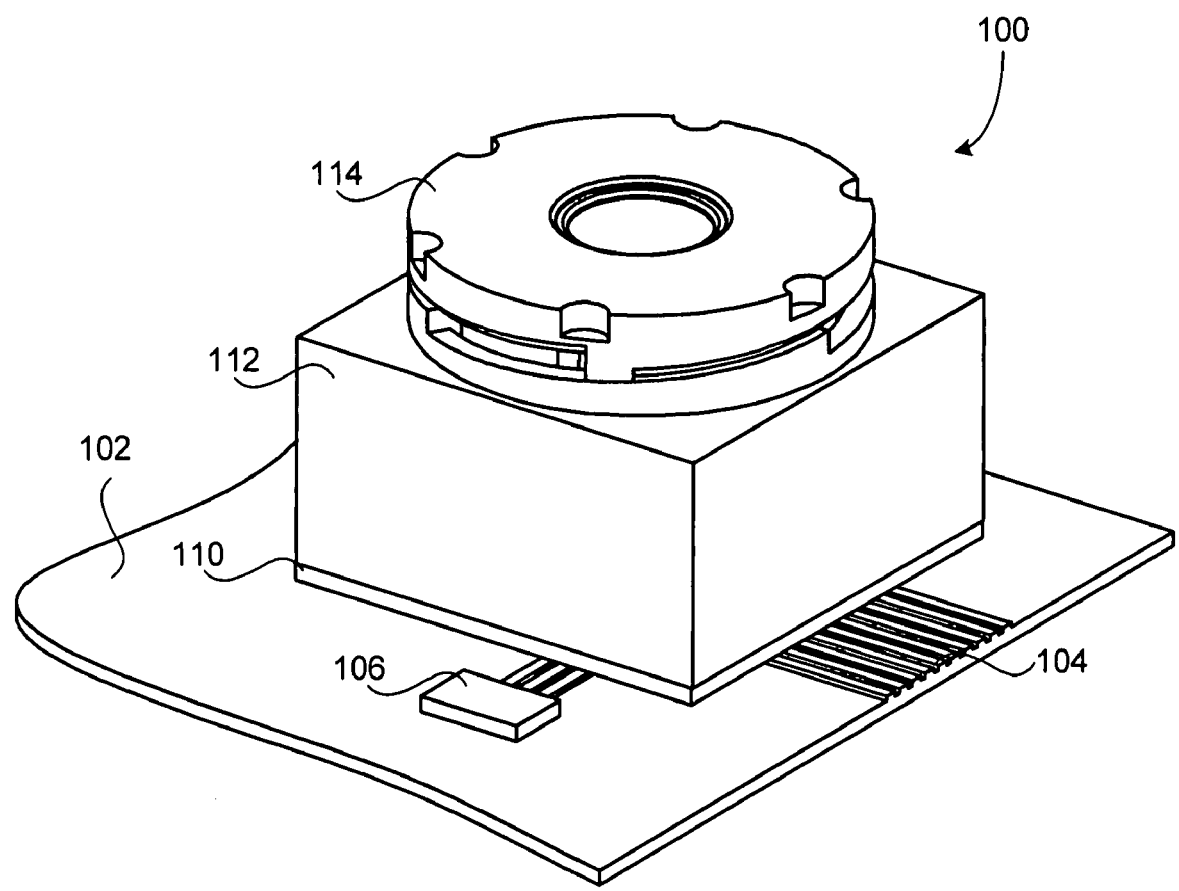
FIG. 1 is a perspective view of a camera module according to one embodiment of the present invention.

FIG. 1 is a perspective view of a camera module 100 according to one embodiment of the present invention. Camera module 100 is shown mounted on a portion of a printed circuit board (PCB) 102 that represents a PCB of a camera hosting device. Camera module 100 communicates electronically with other components of the hosting device via a plurality of conductive traces 104. Device 106 represents an electronic component (e.g., passive device, etc.) that may be mounted directly on PCB 102. Those skilled in the art will recognize that the particular design of PCB 102 will depend on the particular application, and is not particularly relevant to the present invention. Therefore, PCB 102, traces 104, and device 106 are representational in character only.

Camera module 100 includes an image capture device 108 (not visible in the view of FIG. 1), a circuit substrate 110, a housing 112, and a lens unit 114. Circuit substrate 110 is mounted to one end (e.g., the bottom) of housing 112 and lens unit 114 is mounted to the other end (e.g., the top) of housing 112. Image capture device 108 (FIG. 2) is mounted on the top surface of circuit substrate 110, so as to position image capture device 108 between substrate 110 and housing 112.

Figure 2:
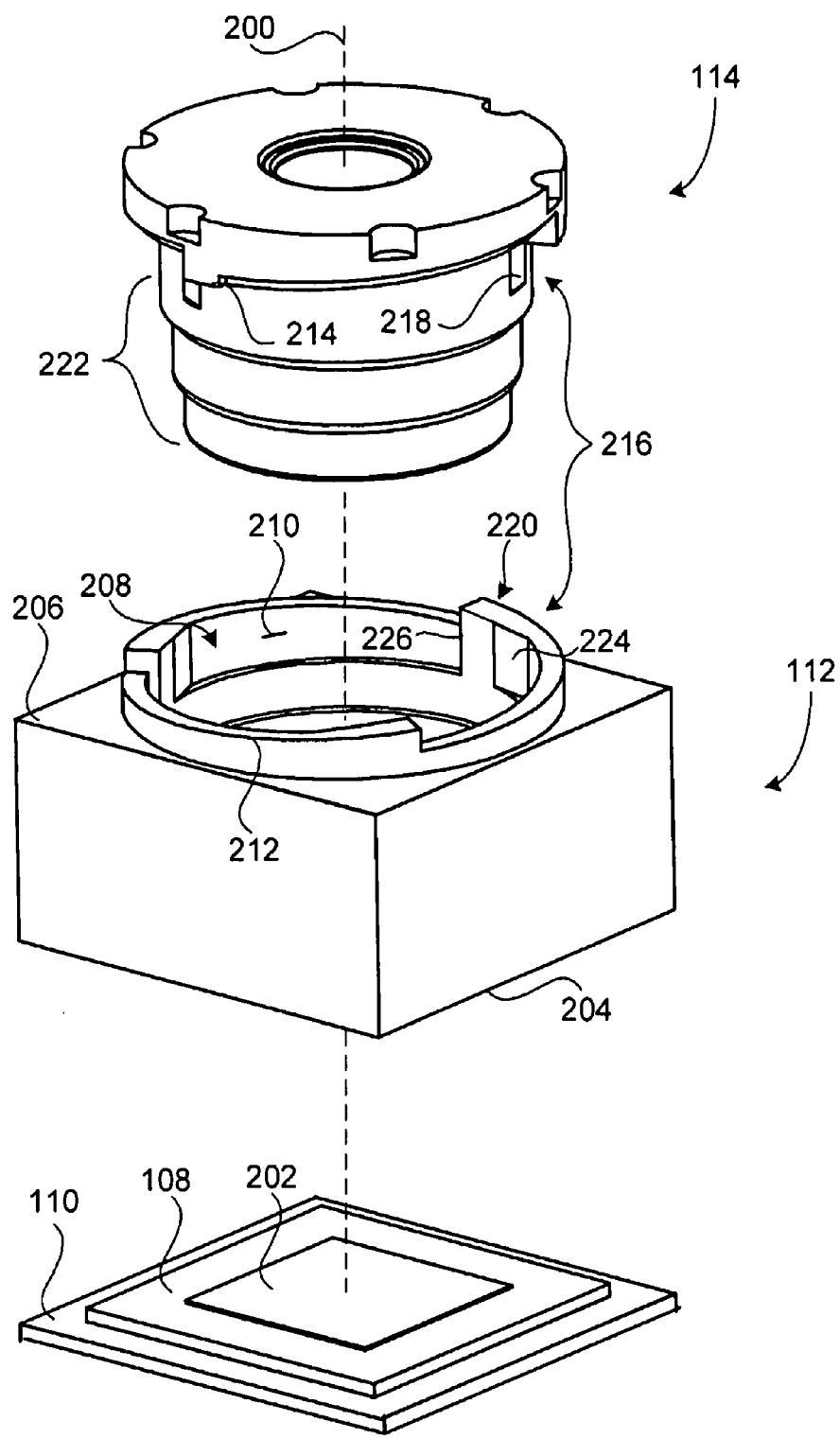
FIG. 2 is a partially exploded perspective view of the camera module of FIG. 1.

FIG. 2 is a partially exploded view of camera module 100, showing some additional details not visible in the view of FIG. 1. Note that the components of camera module 100 are aligned along an optical axis 200. In particular, lens unit 114 and housing 112 are coaxial with respect to optical axis 200. Additionally, image capture device 108 includes an image capture surface 202 that is perpendicular to and centered with respect to optical axis 200. Proper optical alignment of lens unit 114 with respect to image capture device 108 facilitates proper focusing of images onto image capture surface 202.

Image capture surface 202 provides a substantially flat planar surface whereon images are focused and converted into electrical data that is processed by the processing circuitry of image capture device 108 and/or the host device. Data communication between image capture device 108 and substrate 110 can be achieved by any suitable means known to those skilled in the art. For example, image capture device 108 can include a set of contact pads electrically coupled to a complementary set of contact pads of substrate 110 via wire bonding, soldering, or the like. Alternatively, camera module 100 can be assembled without a substrate by coupling image capture device 108 directly to housing 112 and including a means of electrically connecting image capture device 108 directly to PCB 102.

Housing 112 includes a mounting portion 204 and a receiver portion 206. Mounting portion 204 is adapted to mount to substrate 110 so as to enclose image capture device 108 (at least image capture surface 202) between substrate 110 and housing 112. Receiver portion 206 includes an opening 208 that receives lens unit 114. Opening 208 is defined by an inner surface 210 of housing 112. Receiver portion 206 further includes a set of ramps 212 that engage a complementary set of ramps 214 formed on lens unit 114. Ramps 212 are engaged by complementary ramps 214 so as to facilitate the focusing of camera module 100. In particular, rotating lens unit 114 in a counter-clockwise direction raises lens unit 114 with respect to housing 112, thereby increasing the distance between lens unit 114 and image capture surface 202. Conversely, rotating lens unit 114 in a clockwise direction lowers lens unit 114 with respect to housing 112, thereby decreasing the distance between lens unit 114 and image capture surface 202. Thus, an image focused by lens unit 114 can be properly adjusted to lie in the focal plane of image capture surface 202. After lens unit 114 is positioned correctly, lens unit 114 is fixed with respect to housing 112 by some suitable means (e.g., adhesive, thermal weld, etc.).

Before camera module 100 is fixed in a focused position, lens unit 114 can be temporarily locked into a fixed position via a locking feature 216 that prevents lens unit 114 from moving with respect to housing 112. Temporarily fixing lens unit 114 to housing 112 with locking feature 216 prevents lens unit 114 from falling out of housing 112 before lens unit 114 is focused and fixed with respect to housing 112. Locking feature 216 is, therefore, particularly useful when there are one or more processing steps between the insertion of lens unit 114 into housing 112 and the focus/fixation step. For example, during manufacturing, several camera modules can be made at one time, sometimes on a single unitary substrate, which is later separated to form the individual camera modules. If this processing occurs before focusing and fixation, then locking feature 216 will advantageously keep lens unit 114 securely seated in housing 112.

Locking feature 216 includes a set of ribs 218 and a complementary set of rib receivers 220 formed on lens unit 114 and housing 112, respectively. Ribs 218 are vertical protrusions extending parallel to optical axis 200 and formed on an outer surface 222 of lens unit 114. Each one of receivers 220 includes a sloped surface 224 and a seat 226. Sloped surfaces 224 enable ribs 218 to smoothly slide between inner surface 210 and seat 226 so as to facilitate the temporary locking of locking feature 216. Details of locking feature 216 will be more thoroughly described with reference to FIG. 3a and FIG. 3b.

Figure 3A:
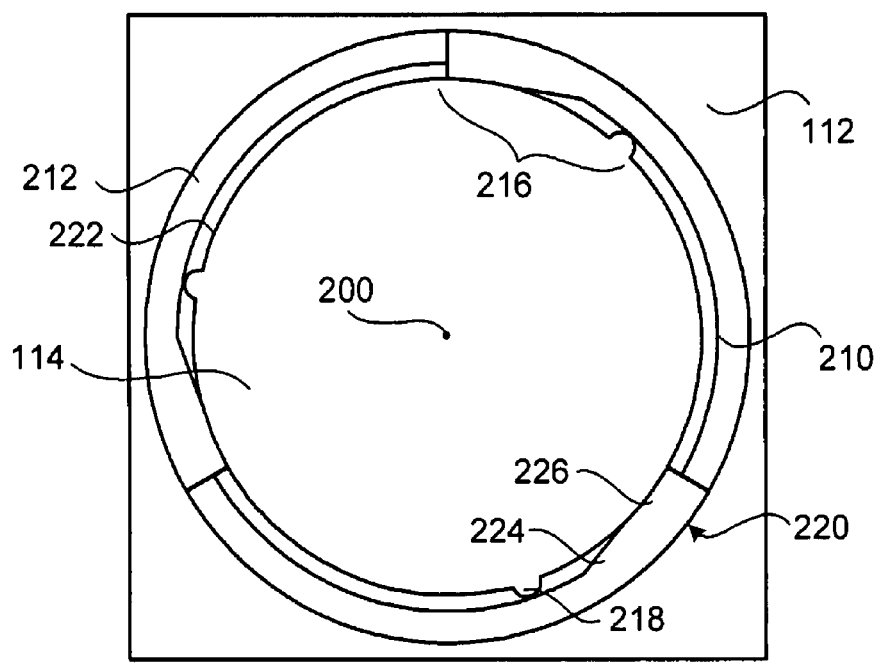
FIG. 3a is a top view of the camera module of FIG. 1 in an unlocked position.

FIG. 3a is a top view of camera module 100 in an unlocked position. Note that the top portion of lens unit 114 (including ramps 214) is cut away in FIGS. 3a and 3b to provide a clear view of the relationship between inner surface 210 of housing 112 and outer surface 222 of lens unit 114. In the unlocked position, lens unit 114 is rotatable within housing 112 such that ribs 218 slidably contact inner surface 210 of housing 112. In addition to facilitating the locking of camera module 100, ribs 218 also help maintain the coaxial relationship between lens unit 114 and housing 112 and limit tilting of lens unit 114 with respect to housing 112. Ribs 218 are evenly spaced about outer surface 222 of lens unit 114 so as to evenly engage inner surface 210 of housing 112. In particular, in this example embodiment, three ribs 218 are evenly spaced approximately 120 degrees about optical axis 200.

Figure 3B:
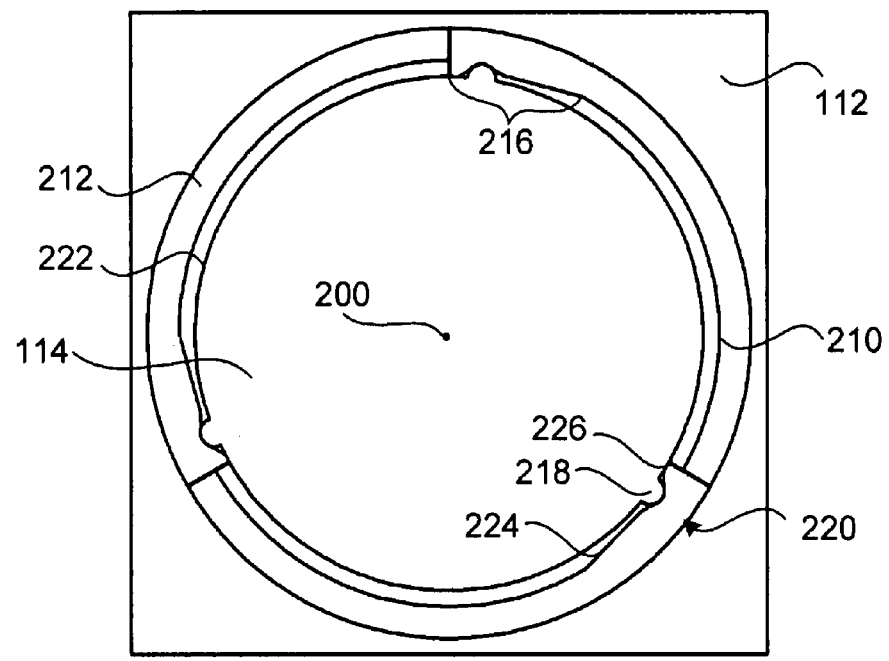
FIG. 3b is a top view of the camera module of FIG. 1 in a locked position.

FIG. 3b is a top view of camera module 100 in a locked position. During the locking of camera module 100, lens unit 114 is rotated counter clockwise about optical axis 200 thereby sliding ribs 218 across inner surface 210. As lens unit 114 is rotated further, ribs 218 slide from inner surface 210 to sloped surfaces 224 and onto seats 226. Note that the distance between seats 226 and optical axis 200 is slightly less than the distance between the outer most surface of ribs 218 and optical axis 200 such that housing 112 provides a compressive force to lens unit 114. This compressive force is sufficient to enable lens unit 114 to be temporarily press-fitted into housing 112. Once press fitted, lens unit 114 is temporarily fixed to housing 112 so as to facilitate additional manufacturing processes to camera module 100 before the focusing process. Lens unit 114 can be disengaged from housing 112 by rotating lens unit 114 about optical axis 200 (clockwise) until ribs 218 disengage seats 226 and engage inner surface 210 of housing 112 again.

Figure 4:
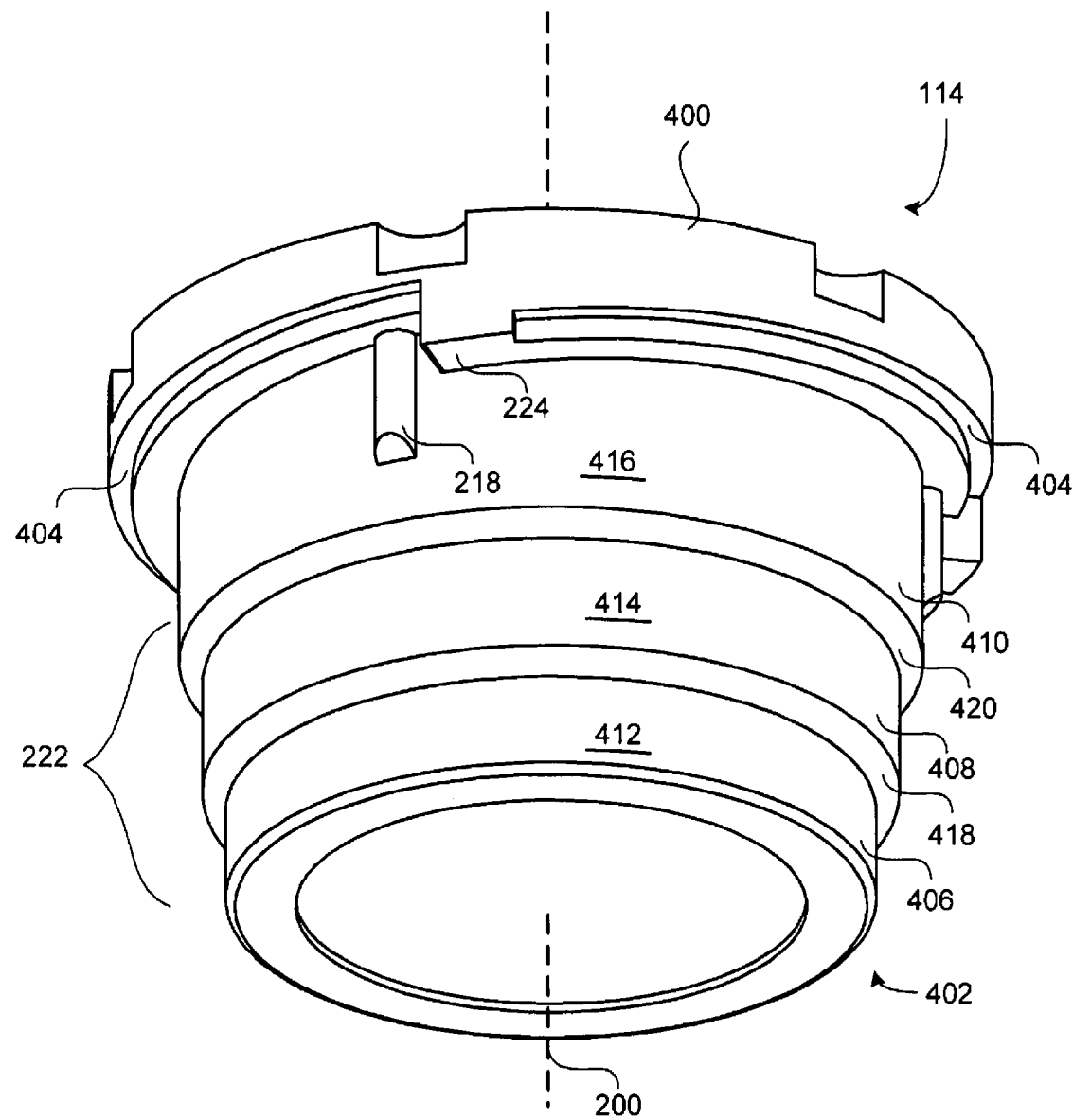
FIG. 4 is a perspective view of the lens unit of FIG. 1 shown in greater detail.

FIG. 4 shows a perspective view of lens unit 114 to include a flange 400 and a body 402. Flange 400 includes previously described ramps 214 and provides a surface for a user and/or machine (e.g., automatic focusing machines) to engage during the focusing or locking/unlocking of camera module 100. Flange 400 further includes a channel 404 that facilitates the fixation of lens unit 114 to housing 112 by providing a space for holding an adhesive or the like. The functionality of channel 404 will be further described later with reference to FIG. 7.

Body 402 includes a first perimeter 406, a second perimeter 408, and a third perimeter 410. First perimeter 406 is defined by a cylindrical outer surface 412 extending parallel to optical axis 200. Likewise, second perimeter 408 is defined by a cylindrical outer surface 414 extending parallel to optical axis 200. Third perimeter 408 is also defined by a cylindrical outer surface 416 extending parallel to optical axis 200. Note that the diameter of perimeter 406 is less than the diameter of perimeter 408, and the diameter of perimeter 408 is less than the diameter of perimeter 410. Surfaces 412 and 414 are joined by an intermediate surface 418. Likewise, surfaces 414 and 416 are joined by a second intermediate surface 420.

Figure 5:
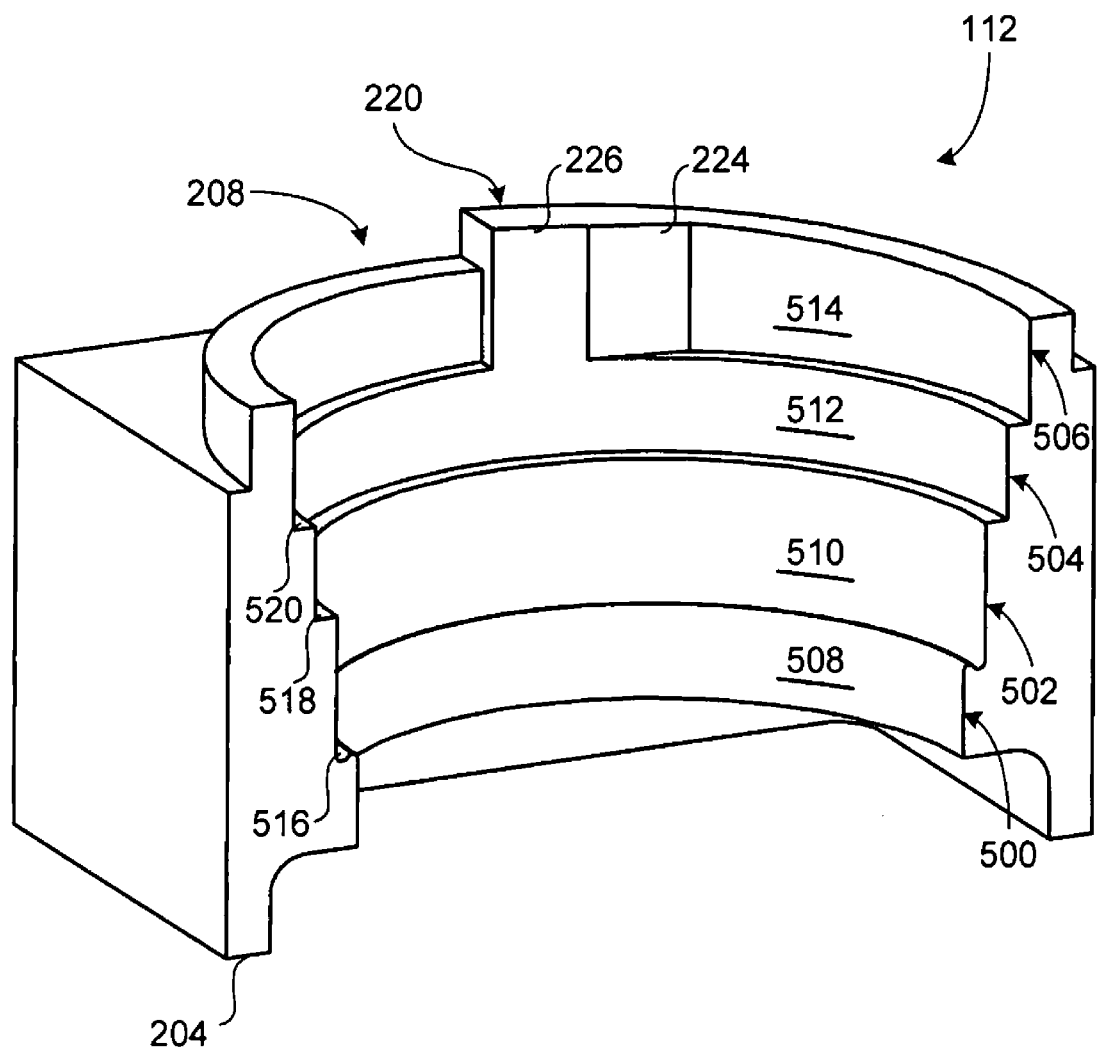
FIG. 5 is a cross-sectioned perspective view of the housing of FIG. 1 shown in greater detail.

FIG. 5 is a perspective cross-sectional view of housing 112 showing additional features not visible in previously described figures. As shown, opening 208 has a first perimeter 500, a second perimeter 502, a third perimeter 504, and a fourth perimeter 506. First perimeter 500 is defined by a cylindrical inner surface 508 that is contoured to slidably contact outer surface 412 of lens unit 114 (FIG. 4). Second perimeter 502 is defined by a cylindrical inner surface 510 that is contoured to slidably contact outer surface 414 of lens unit 114. Third perimeter 504 is defined by a cylindrical inner surface 512 which is contoured to slidably contact outer surface 416 of lens unit 114. Fourth perimeter 506 is defined by an inner surface 514 for slidably engaging ribs 218. Inner cylindrical surface 508 and inner cylindrical surface 510 are joined by a first contaminant collecting surface 516. Similarly, inner cylindrical surfaces 510 and 512 are joined by a second contaminant collecting surface 518, and inner cylindrical surfaces 512 and 514 are joined by a third contaminant collecting surface 520.

Figure 6A:
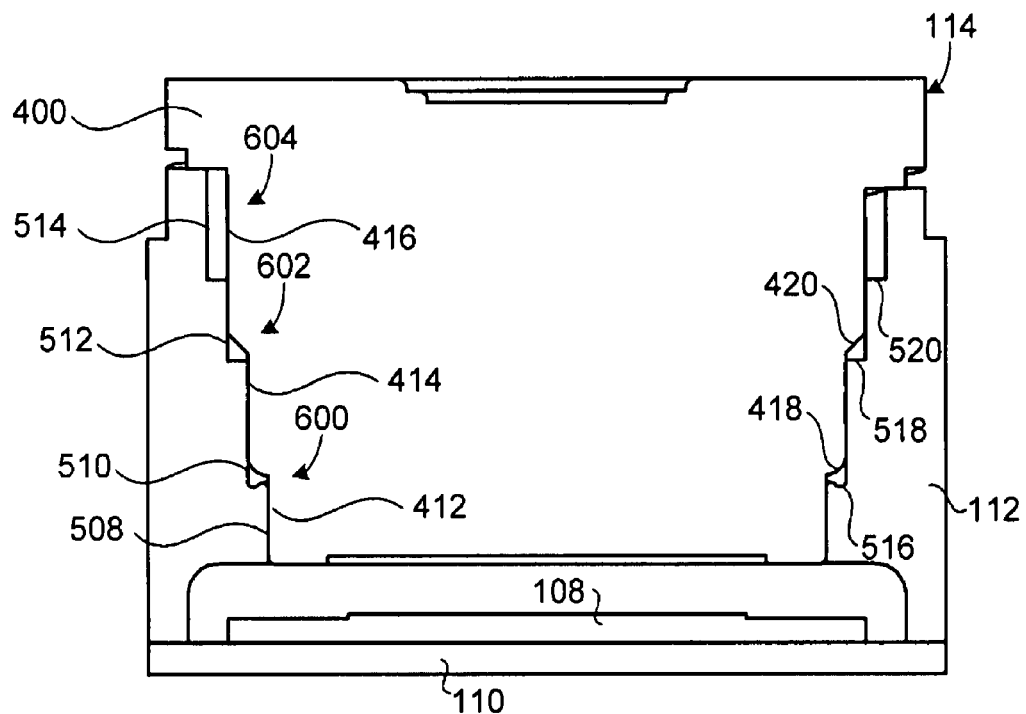
FIG. 6a is a cross-sectioned side view of the camera module of FIG. 1 in an unfocused position.

FIG. 6a shows a cross-sectional view of camera module 100 in an unfocused, locked position. In this particular embodiment, camera module 100 defines a first contaminant trap 600, a second contaminant trap 602, and a third contaminant trap 604. First contaminant trap 600 is an isolated annular space defined by outer surface 412 of lens unit 114, intermediate surface 418 of lens unit 114, inner surface 510 of housing 112, and contaminant collecting surface 516 of housing 112. As shown, contaminant collecting surface 516 of housing 112 defines a rounded channel for collecting and holding any contaminants (e.g., particulate debris, glue, etc.) that enter contaminant trap 600. Second contaminant trap 602 is an isolated annular space defined by outer surface 414 of lens unit 114, intermediate surface 420 of lens unit 114, inner surface 512 of housing 112, and contaminant collecting surface 518 of housing 112. Contaminant collecting surface 518 is a flat surface for collecting contaminants that enter contaminant trap 602. Third contaminant trap 604 is an isolated annular space defined by outer surface 416 of lens unit 114, flange 400 of lens unit 114, inner surface 514 of housing 112, and contaminant collecting surface 520 of housing 112. Contaminant collecting surface 520 also defines a flat surface for collecting contaminants.

Figure 6B:
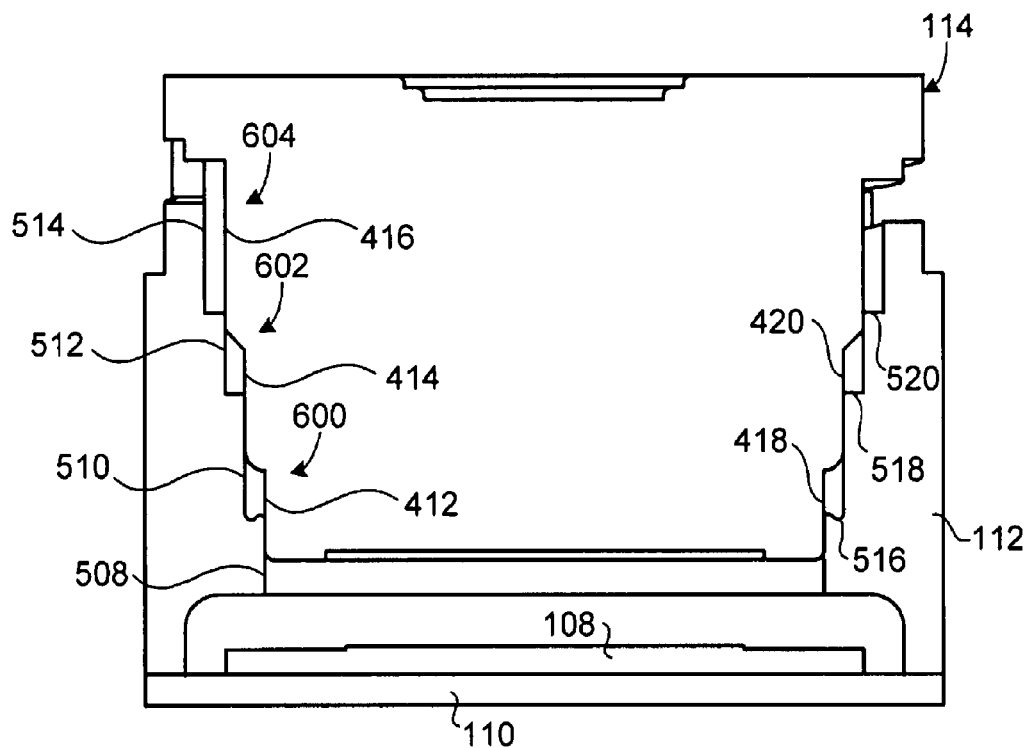
FIG. 6b is a cross-sectioned side view of the camera module of FIG. 1 in a focused position.

FIG. 6b shows a cross-sectioned view of camera module 100 in an unlocked, focused position. Note that lens unit 114 is relatively higher with respect to housing 112 than in FIG. 6a. Nevertheless, first outer surface 412 of lens unit 114 remains in contact with first inner surface 508. Likewise, second outer surface 414 of lens unit 114 remains in contact with second inner surface 510, and third outer surface 416 remains in contact with third inner surface 512. As a result, the volumes of contaminant traps 600, 602, and 604 all increase as the distance between lens unit 114 and image capture device 108 increases. Further, as the volumes are changed, contaminant traps 600 and 602 remain closed, so as to prevent any contaminants from escaping further into camera module 100.

In summary, in the unlocked, focused position (raised), the lens unit 114 and the housing 112 are relatively positioned as follows. First outer surface 412 is simultaneously disposed within first inner surface 508 and second inner surface 510. In addition, second outer surface 414 is simultaneously disposed within second inner surface 510 and third inner surface 512, and the third outer surface 416 is simultaneously disposed within the third inner surface 512 and inner surface 514. In this manner, particle traps 600, 602, and 604 are formed between lens unit 114 and housing 112. For example, particle trap 604 would be effective to catch excess adhesive used to fix lens unit 114 to housing 112.

Figure 7:
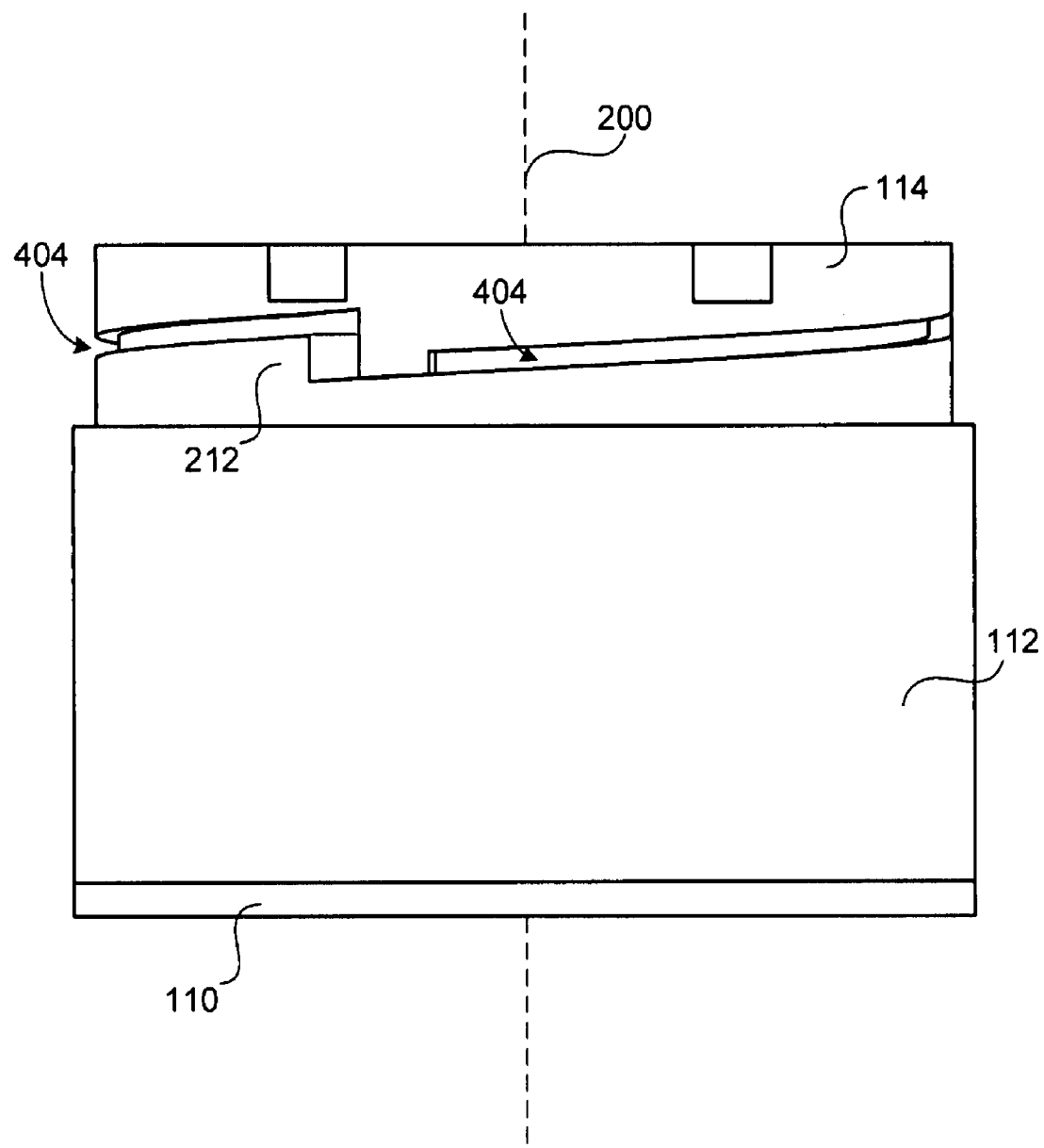
FIG. 7 is a side view of the camera module of FIG. 1 showing the relationship between the lens unit and the housing.

FIG. 7 is a side view of camera module 100 showing the relationship between channel 404 of lens unit 114 and ramps 212 of housing 112. Channel 404 and ramps 212 form a recess for receiving an adhesive (not shown) which fixes lens unit 114 to housing 112. During the focusing process, lens unit 114 is rotated about optical axis 200 until it is in proper focus. Then, an adhesive is applied within channel 404. Channel 404 provides a small reservoir for the adhesive, which reduces the probability of the adhesive spreading into unwanted areas. The adhesive fuses channel 404 to one or more of ramps 212, thereby immobilizing lens unit 114 with respect to housing 112. It should be understood that lens unit 114 can be fixed in position with respect to housing 112 by any suitable alternative means (e.g., a thermal weld, fastener, etc.).

Figure 8:
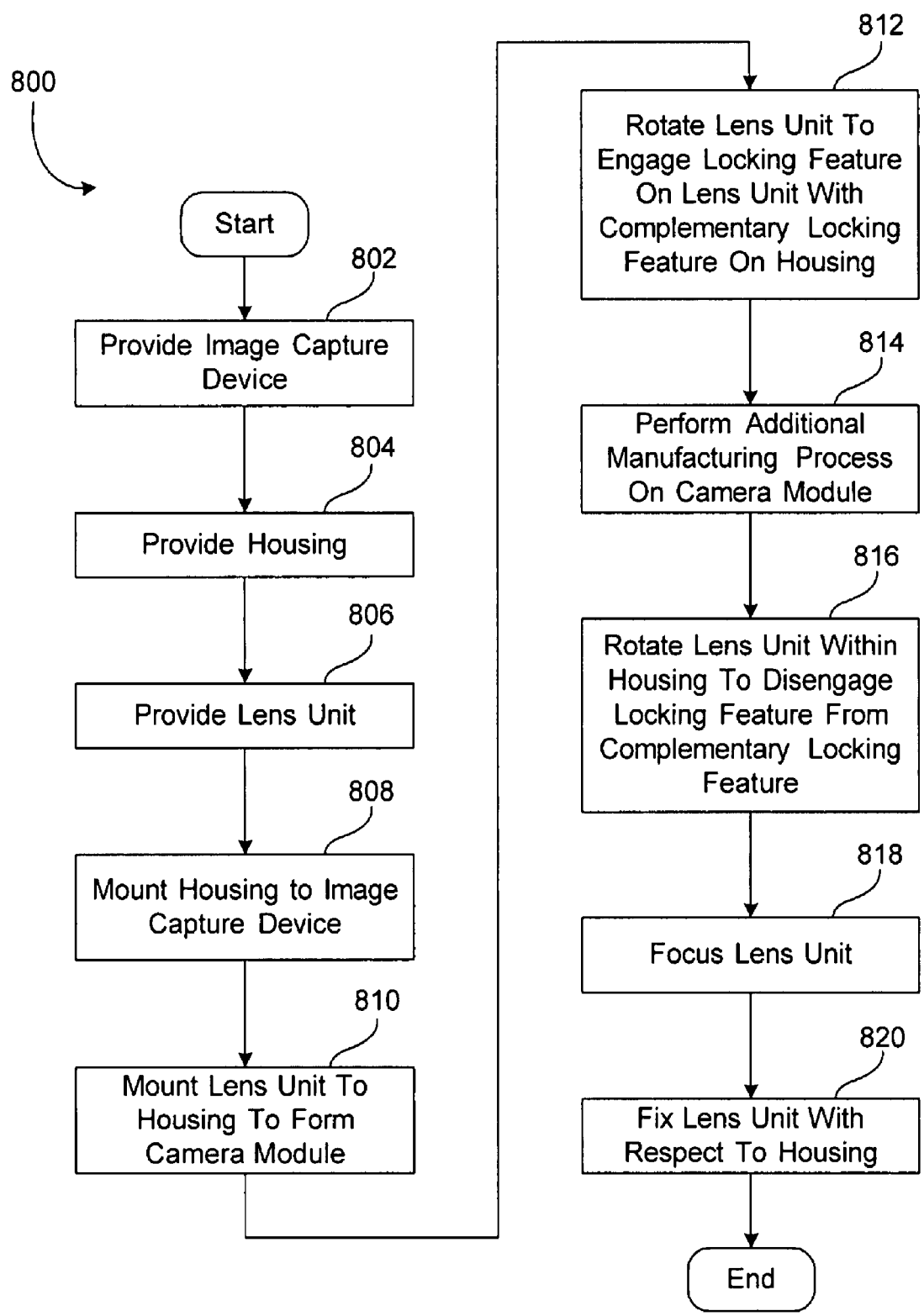
FIG. 8 is a flow chart summarizing a method for manufacturing a camera module.

FIG. 8 is a flow chart summarizing a method 800 for manufacturing a camera module. In a first step 802, an image capture device is provided. Next, in a second step 804, a housing is provided. Then, in a third step 806, a lens unit is provided. Next, in a fourth step 808, the housing is mounted to the image capture device. Then in a fifth step 810, the lens unit is mounted to the housing to form a camera module. Next, in a sixth step 812, the lens unit is rotated to engage a locking feature on the lens unit with a complementary locking feature on the housing. Then, in a seventh step 814, an additional manufacturing process is performed on the camera module. Next, in an eighth step 816, the lens unit is rotated to disengage the locking feature on the lens unit from the complementary locking feature on the housing. Then, in a ninth step 818, the lens unit is focused. Finally, in a tenth step 820, the lens unit is fixed with respect to the housing.

The description of particular embodiments of the present invention is now complete. Many of the described features may be substituted, altered or omitted without departing from the scope of the invention. For example, alternate focus mechanisms may be substituted for those described above. Such focus mechanisms can include complementary thread sets in conjunction with the particle traps described herein. As another example, alternate methods may be used for mounting the circuit substrate to the housing. As yet another example, alternate types (e.g., socket, edge connector, etc.) and locations (e.g., side contacts, etc.) of electrical connections between circuit substrate 110 and PCB 102. As yet another example, alternate means for fixing the lens unit with respect to the housing can be used. These and other deviations from the particular embodiments shown will be apparent to those skilled in the art, particularly in view of the foregoing disclosure.

We claim:

1. A camera module comprising:
   an image capture device with an image capture surface;
   a lens unit including a body extending perpendicularly with respect to said image capture surface of said image capture device, said body having a first surface having a first outer perimeter parallel to said image capture surface;
   a housing including a mounting portion coupled to said image capture device and a receiver portion defining an opening for receiving said lens unit, said opening including a first surface having a first inner perimeter and a second surface having a second inner perimeter, said first inner perimeter being smaller than said second inner perimeter, said first surface of said opening being disposed between said second surface of said opening and said image capture device;
   a ramp disposed on one of said lens unit and said housing; and
   a ramp engaging structure disposed on the other of said lens unit and said housing; and
   wherein said first surface of said lens unit slidably contacts said first surface of said opening, said first surface of said lens unit remaining in contact with said first surface of said opening when said lens unit is moved a predetermined distance along an axis perpendicular to said image capture surface, thereby preventing contaminants from passing between said first surface of said lens unit and said first surface of said opening.

2. A camera module according to claim 1, wherein said first surface of said opening and said second surface of said opening are joined by a first contaminant collecting surface.

3. A camera module according to claim 2, wherein said first contaminant collecting surface includes a flat surface parallel to said image capture surface.

4. A camera module according to claim 2, wherein said first contaminant collecting surface defines a channel.

5. A camera module according to claim 2, wherein said first contaminant collecting surface is tilted with respect to said image capture surface.

6. A camera module according to claim 1, wherein said first surface of said lens unit is simultaneously disposed within said first surface of said opening and said second surface of said opening.

7. A camera module according to claim 1, wherein said lens unit further includes a second surface having a second outer perimeter, said second outer perimeter being larger than said first outer perimeter, said second surface of said lens unit slidably contacting said second surface of said opening.

8. A camera module according to claim 7, wherein at least one of said second surface of said lens unit and said second surface of said opening define a plurality of protrusions disposed to provide slidable contact between said second outer surface of said lens unit and said second inner perimeter of said opening.

9. A camera module according to claim 8, wherein said protrusions are ribs extending perpendicularly with respect to said image capture surface.

10. A camera module according to claim 7, wherein said first surface of said opening and said second surface of said opening are joined by a first transitional surface, and said first surface of said lens unit and said second surface of said lens unit are joined by a second transitional surface.

11. A camera module according to claim 10, wherein said first transitional surface, said second surface of said opening, said second transitional surface, and said first surface of said lens unit enclose a space apart from said image capture surface.

12. A camera module according to claim 11, wherein said enclosed space is an annular space, said annular space having a volume that is increased as the distance between said lens unit and said image capture device is increased.

13. A camera module according to claim 10, wherein:
   said opening further includes a third surface having a third inner perimeter, said third inner perimeter being larger than said second inner perimeter, said second surface of said opening being disposed between said third surface of said opening and said image capture device; and
   said lens unit further includes a third surface having a third outer perimeter, said third outer perimeter being larger than said second outer perimeter, said third surface of said lens unit slidably contacting said third surface of said opening.

14. A camera module according to claim 13, wherein at least one of said third surface of said lens unit and said third surface of said opening define a plurality of protrusions disposed to provide slidable contact between said third surface of said lens unit and said third surface of said opening.

15. A camera module according to claim 14, wherein said protrusions extend perpendicularly with respect to said image capture surface.

16. A camera module according to claim 13, wherein:
   said second surface of said opening and said third surface of said opening are joined by a third transitional surface; and
   said second surface of said lens unit and said third surface of said lens unit are joined by a fourth transitional surface.

17. A camera module according to claim 16, wherein:
   said first transitional surface, said second surface of said opening, said second transitional surface, and said first surface of said lens unit enclose a space apart from said image capture surface; and
   said third surface of said opening, said third transitional surface, said second surface of said lens unit, and said fourth transitional surface enclose a second space apart from said image capture surface.

18. A camera module according to claim 17, wherein:
   said enclosed space has an annular shape, said enclosed space having a volume that is increased as the distance between said lens unit and said image capture device is increased; and said second enclosed space has an annular shape, said second enclosed space having a volume that is increased as the distance between said lens unit and said image capture device is increased.

19. A camera module according to claim 17, wherein said opening further includes a fourth surface having a fourth inner perimeter, said fourth inner perimeter being larger than said third inner perimeter, said third inner perimeter of said opening being disposed between said fourth inner perimeter of said opening and said image capture device.

20. A camera module according to claim 19, wherein said lens unit includes a fourth surface having a fourth outer perimeter, said fourth outer perimeter being larger than said third outer perimeter, said fourth surface of said lens unit slidably contacting said fourth surface of said opening.

21. A camera module according to claim 20, wherein at least one of said third surface of said lens unit and said fourth surface of said opening define a plurality of protrusions disposed to provide slidable contact between said third surface of said lens unit and said fourth surface of said opening.

22. A camera module according to claim 21, wherein said protrusions extend perpendicularly with respect to said image capture surface.

23. A camera module according to claim 20, wherein said third surface of said opening and said fourth surface of said opening are joined by a fifth transitional surface.

24. A camera module according to claim 23, wherein said third surface of said lens unit, said fifth transitional surface, and said fourth surface of said opening define a contaminant trap.

25. A camera module according to claim 24, wherein said contaminant trap includes an annular space, said annular space having a volume that is increased as the distance between said lens unit and said image capture device is increased.

26. A camera module according to claim 1, wherein said ramp engaging structure includes a second ramp that is complementary to said ramp.

27. A camera module according to claim 1, wherein said ramp defines a recess for receiving an adhesive to bond said lens unit to said housing.

28. A camera module according to claim 27, wherein said recess is a channel formed on said ramp.

29. A camera module comprising:
an image capture device with an image capture surface;
a lens unit including a body extending perpendicularly with respect to said image capture surface of said image capture device, said body having a first surface having a first outer perimeter parallel to said image capture surface; and
a housing including a mounting portion coupled to said image capture device and a receiver portion defining an opening for receiving said lens unit, said opening including a first surface having a first inner perimeter and a second surface having a second inner perimeter, said first inner perimeter being smaller than said second inner perimeter, said first surface of said opening being disposed between said second surface of said opening and said image capture device; and wherein
said first surface of said lens unit slidably contacts said first surface of said opening, said first surface of said lens unit remaining in contact with said first surface of said opening when said lens unit is moved a predetermined distance along an axis perpendicular to said image capture surface, thereby preventing contaminants from passing between said first surface of said lens unit and said first surface of said opening;

said first surface of said opening and said second surface of said opening are joined by a first contaminant collecting surface; and
said first contaminant collecting surface is tilted with respect to said image capture surface.

30. A camera module according to claim 29, wherein said first contaminant collecting surface defines a channel.

31. A camera module according to claim 29, wherein said first surface of said lens unit is simultaneously disposed within said first surface of said opening and said second surface of said opening.

32. A camera module according to claim 29, wherein said lens unit further includes a second surface having a second outer perimeter, said second outer perimeter being larger than said first outer perimeter, said second surface of said lens unit slidably contacting said second surface of said opening.

33. A camera module according to claim 32, wherein at least one of said second surface of said lens unit and said second surface of said opening define a plurality of protrusions disposed to provide slidable contact between said second outer surface of said lens unit and said second inner perimeter of said opening.

34. A camera module according to claim 33, wherein said protrusions are ribs extending perpendicularly with respect to said image capture surface.

35. A camera module according to claim 32, wherein:
said first contaminant collecting surface defines a first transitional surface between said first surface of said opening and said second surface of said opening; and
said first surface of said lens unit and said second surface of said lens unit are joined by a second transitional surface.

36. A camera module according to claim 35, wherein said first transitional surface, said second surface of said opening, said second transitional surface, and said first surface of said lens unit enclose a space apart from said image capture surface.

37. A camera module according to claim 36, wherein said enclosed space is an annular space, said annular space having a volume that is increased as the distance between said lens unit and said image capture device is increased.

38. A camera module according to claim 35, wherein:
said opening further includes a third surface having a third inner perimeter, said third inner perimeter being larger than said second inner perimeter, said second surface of said opening being disposed between said third surface of said opening and said image capture device; and
said lens unit further includes a third surface having a third outer perimeter, said third outer perimeter being larger than said second outer perimeter, said third surface of said lens unit slidably contacting said third surface of said opening.

39. A camera module according to claim 38, wherein at least one of said third surface of said lens unit and said third surface of said opening define a plurality of protrusions disposed to provide slidable contact between said third surface of said lens unit and said third surface of said opening.

40. A camera module according to claim 39, wherein said protrusions extend perpendicularly with respect to said image capture surface.

41. A camera module according to claim 38, wherein:
said second surface of said opening and said third surface of said opening are joined by a third transitional surface; and
said second surface of said lens unit and said third surface of said lens unit are joined by a fourth transitional surface.

42. A camera module according to claim 41, wherein:
said first transitional surface, said second surface of said opening, said second transitional surface, and said first surface of said lens unit enclose a space apart from said image capture surface; and
said third surface of said opening, said third transitional surface, said second surface of said lens unit, and said fourth transitional surface enclose a second space apart from said image capture surface.

43. A camera module according to claim 42, wherein:
said enclosed space has an annular shape, said enclosed space having a volume that is increased as the distance between said lens unit and said image capture device is increased; and
said second enclosed space has an annular shape, said second enclosed space having a volume that is increased as the distance between said lens unit and said image capture device is increased.

44. A camera module according to claim 42, wherein said opening further includes a fourth surface having a fourth inner perimeter, said fourth inner perimeter being larger than said third inner perimeter, said third inner perimeter of said opening being disposed between said fourth inner perimeter of said opening and said image capture device.

45. A camera module according to claim 44, wherein said lens unit includes a fourth surface having a fourth outer perimeter, said fourth outer perimeter being larger than said third outer perimeter, said fourth surface of said lens unit slidably contacting said fourth surface of said opening.

46. A camera module according to claim 45, wherein at least one of said third surface of said lens unit and said fourth surface of said opening define a plurality of protrusions disposed to provide slidable contact between said third surface of said lens unit and said fourth surface of said opening.

47. A camera module according to claim 46, wherein said protrusions extend perpendicularly with respect to said image capture surface.

48. A camera module according to claim 45, wherein said third surface of said opening and said fourth surface of said opening are joined by a fifth transitional surface.

49. A camera module according to claim 48, wherein said third surface of said lens unit, said fifth transitional surface, and said fourth surface of said opening define a contaminant trap.

50. A camera module according to claim 49, wherein said contaminant trap includes an annular space, said annular space having a volume that is increased as the distance between said lens unit and said image capture device is increased.

51. A camera module according to claim 29, further including:
a ramp disposed on one of said lens unit and said housing; and
a ramp engaging structure disposed on the other of said lens unit and said housing; and
wherein said ramp engaging structure includes a second ramp that is complementary to said ramp.

52. A camera module according to claim 29, further including:
a ramp disposed on one of said lens unit and said housing; and
a ramp engaging structure disposed on the other of said lens unit and said housing; and
wherein said ramp defines a recess for receiving an adhesive to bond said lens unit to said housing.

53. A camera module according to claim 52, wherein said recess is a channel formed on said ramp.

54. A camera module according to claim 29, further including:
a thread set formed on said lens unit; and
a complementary thread set formed on said housing.

55. A camera module comprising:
an image capture device with an image capture surface;
a lens unit including a body extending perpendicularly with respect to said image capture surface of said image capture device, said body having a first surface having a first outer perimeter parallel to said image capture surface; and
a housing including a mounting portion coupled to said image capture device and a receiver portion defining an opening for receiving said lens unit, said opening including a first surface having a first inner perimeter and a second surface having a second inner perimeter, said first inner perimeter being smaller than said second inner perimeter, said first surface of said opening being disposed between said second surface of said opening and said image capture device; and wherein
said first surface of said lens unit slidably contacts said first surface of said opening, said first surface of said lens unit remaining in contact with said first surface of said opening when said lens unit is moved a predetermined distance along an axis perpendicular to said image capture surface, thereby preventing contaminants from passing between said first surface of said lens unit and said first surface of said opening;
said lens unit further includes a second surface having a second outer perimeter, said second outer perimeter being larger than said first outer perimeter, said second surface of said lens unit slidably contacting said second surface of said opening; and
at least one of said second surface of said lens unit and said second surface of said opening define a plurality of protrusions disposed to provide slidable contact between said second outer surface of said lens unit and said second inner perimeter of said opening.

56. A camera module according to claim 55, wherein said first surface of said opening and said second surface of said opening are joined by a first contaminant collecting surface.

57. A camera module according to claim 56, wherein said first contaminant collecting surface includes a flat surface parallel to said image capture surface.

58. A camera module according to claim 56, wherein said first contaminant collecting surface defines a channel.

59. A camera module according to claim 55, wherein said first surface of said lens unit is simultaneously disposed within said first surface of said opening and said second surface of said opening.

60. A camera module according to claim 55, wherein said protrusions are ribs extending perpendicularly with respect to said image capture surface.

61. A camera module according to claim 55, wherein said first surface of said opening and said second surface of said opening are joined by a first transitional surface, and said first surface of said lens unit and said second surface of said lens unit are joined by a second transitional surface.

62. A camera module according to claim 61, wherein said first transitional surface, said second surface of said opening, said second transitional surface, and said first surface of said lens unit enclose a space apart from said image capture surface.

63. A camera module according to claim 62, wherein said enclosed space is an annular space, said annular space having a volume that is increased as the distance between said lens unit and said image capture device is increased.

64. A camera module according to claim 61, wherein:
said opening further includes a third surface having a third inner perimeter, said third inner perimeter being smaller than said first inner perimeter, said third surface of said opening being disposed between said first surface of said opening and said image capture device; and
said lens unit further includes a third surface having a third outer perimeter, said third outer perimeter being smaller than said first outer perimeter, said third surface of said lens unit slidably contacting said third surface of said opening.

65. A camera module according to claim 64, wherein:
said first surface of said opening and said third surface of said opening are joined by a third transitional surface; and
said first surface of said lens unit and said third surface of said lens unit are joined by a fourth transitional surface.

66. A camera module according to claim 65, wherein:
said first transitional surface, said second surface of said opening, said second transitional surface, and said first surface of said lens unit enclose a space apart from said image capture surface; and
said first surface of said opening, said third transitional surface, said third surface of said lens unit, and said fourth transitional surface enclose a second space apart from said image capture surface.

67. A camera module according to claim 66, wherein:
said enclosed space has an annular shape, said enclosed space having a volume that is increased as the distance between said lens unit and said image capture device is increased; and
said second enclosed space has an annular shape, said second enclosed space having a volume that is increased as the distance between said lens unit and said image capture device is increased.

68. A camera module according to claim 66, wherein said opening further includes a fourth surface having a fourth inner perimeter, said fourth inner perimeter being larger than said second inner perimeter, said second inner perimeter of said opening being disposed between said fourth inner perimeter of said opening and said image capture device.

69. A camera module according to claim 68, wherein said lens unit includes a fourth surface having a fourth outer perimeter, said fourth outer perimeter being larger than said second outer perimeter, said fourth surface of said lens unit slidably contacting said fourth surface of said opening.

70. A camera module according to claim 69, wherein said second surface of said opening and said fourth surface of said opening are joined by a fifth transitional surface.

71. A camera module according to claim 70, wherein said second surface of said lens unit, said fifth transitional surface, and said fourth surface of said opening define a contaminant trap.

72. A camera module according to claim 71, wherein said contaminant trap includes an annular space, said annular space having a volume that is increased as the distance between said lens unit and said image capture device is increased.

73. A camera module according to claim 55, further including:
a ramp disposed on one of said lens unit and said housing; and
a ramp engaging structure disposed on the other of said lens unit and said housing; and
wherein said ramp engaging structure includes a second ramp that is complementary to said ramp.

74. A camera module according to claim 55, further including:
a ramp disposed on one of said lens unit and said housing; and
a ramp engaging structure disposed on the other of said lens unit and said housing; and
wherein said ramp defines a recess for receiving an adhesive to bond said lens unit to said housing.

75. A camera module according to claim 74, wherein said recess is a channel formed on said ramp.

76. A camera module according to claim 55, further including:
a thread set formed on said lens unit; and
a complementary thread set formed on said housing.

77. A camera module comprising:
an image capture device with an image capture surface;
a lens unit including a body extending perpendicularly with respect to said image capture surface of said image capture device, said body having a first surface having a first outer perimeter parallel to said image capture surface; and
a housing including a mounting portion coupled to said image capture device and a receiver portion defining an opening for receiving said lens unit, said opening including a first surface having a first inner perimeter and a second surface having a second inner perimeter, said first inner perimeter being smaller than said second inner perimeter, said first surface of said opening being disposed between said second surface of said opening and said image capture device; and wherein
said first surface of said lens unit slidably contacts said first surface of said opening, said first surface of said lens unit remaining in contact with said first surface of said opening when said lens unit is moved a predetermined distance along an axis perpendicular to said image capture surface, thereby preventing contaminants from passing between said first surface of said lens unit and said first surface of said opening;
said lens unit further includes a second surface having a second outer perimeter, said second outer perimeter being larger than said first outer perimeter, said second surface of said lens unit slidably contacting said second surface of said opening;
said first surface of said opening and said second surface of said opening are joined by a first transitional surface, and said first surface of said lens unit and said second surface of said lens unit are joined by a second transitional surface;
said opening further includes a third surface having a third inner perimeter, said third inner perimeter being larger than said second inner perimeter, said second surface of said opening being disposed between said third surface of said opening and said image capture device; and
said lens unit further includes a third surface having a third outer perimeter, said third outer perimeter being larger than said second outer perimeter, said third surface of said lens unit slidably contacting said third surface of said opening.

78. A camera module according to claim 77, wherein said first transitional surface defines a first contaminant collecting surface.

79. A camera module according to claim 78, wherein said first contaminant collecting surface includes a flat surface parallel to said image capture surface.

80. A camera module according to claim 78, wherein said first contaminant collecting surface defines a channel.

81. A camera module according to claim 78, wherein said first contaminant collecting surface is tilted with respect to said image capture surface.

82. A camera module according to claim 77, wherein said first surface of said lens unit is simultaneously disposed within said first surface of said opening and said second surface of said opening.

83. A camera module according to claim 77, wherein said first transitional surface, said second surface of said opening, said second transitional surface, and said first surface of said lens unit enclose a space apart from said image capture surface.

84. A camera module according to claim 83, wherein said enclosed space is an annular space, said annular space having a volume that is increased as the distance between said lens unit and said image capture device is increased.

85. A camera module according to claim 77, wherein at least one of said third surface of said lens unit and said third surface of said opening define a plurality of protrusions disposed to provide slidable contact between said third surface of said lens unit and said third surface of said opening.

86. A camera module according to claim 85, wherein said protrusions extend perpendicularly with respect to said image capture surface.

87. A camera module according to claim 77, wherein:
said second surface of said opening and said third surface of said opening are joined by a third transitional surface; and
said second surface of said lens unit and said third surface of said lens unit are joined by a fourth transitional surface.

88. A camera module according to claim 87, wherein:
said first transitional surface, said second surface of said opening, said second transitional surface, and said first surface of said lens unit enclose a space apart from said image capture surface; and
said third surface of said opening, said third transitional surface, said second surface of said lens unit, and said fourth transitional surface enclose a second space apart from said image capture surface.

89. A camera module according to claim 88, wherein:
said enclosed space has an annular shape, said enclosed space having a volume that is increased as the distance between said lens unit and said image capture device is increased; and
said second enclosed space has an annular shape, said second enclosed space having a volume that is increased as the distance between said lens unit and said image capture device is increased.

90. A camera module according to claim 88, wherein said opening further includes a fourth surface having a fourth inner perimeter, said fourth inner perimeter being larger than said third inner perimeter, said third inner perimeter of said opening being disposed between said fourth inner perimeter of said opening and said image capture device.

91. A camera module according to claim 90, wherein said lens unit includes a fourth surface having a fourth outer perimeter, said fourth outer perimeter being larger than said third outer perimeter, said fourth surface of said lens unit slidably contacting said fourth surface of said opening.

92. A camera module according to claim 91, wherein at least one of said third surface of said lens unit and said fourth surface of said opening define a plurality of protrusions disposed to provide slidable contact between said third surface of said lens unit and said fourth surface of said opening.

93. A camera module according to claim 92, wherein said protrusions extend perpendicularly with respect to said image capture surface.

94. A camera module according to claim 91, wherein said third surface of said opening and said fourth surface of said opening are joined by a fifth transitional surface.

95. A camera module according to claim 94, wherein said third surface of said lens unit, said fifth transitional surface, and said fourth surface of said opening define a contaminant trap.

96. A camera module according to claim 95, wherein said contaminant trap includes an annular space, said annular space having a volume that is increased as the distance between said lens unit and said image capture device is increased.

97. A camera module according to claim 77, further including:
a ramp disposed on one of said lens unit and said housing; and
a ramp engaging structure disposed on the other of said lens unit and said housing; and
wherein said ramp engaging structure includes a second ramp that is complementary to said ramp.

98. A camera module according to claim 77, further including:
a ramp disposed on one of said lens unit and said housing; and
a ramp engaging structure disposed on the other of said lens unit and said housing; and
wherein said ramp defines a recess for receiving an adhesive to bond said lens unit to said housing.

99. A camera module according to claim 98, wherein said recess is a channel formed on said ramp.

100. A camera module according to claim 77, further including:
a thread set formed on said lens unit; and
a complementary thread set formed on said housing.

* * * * *